United States Patent
Takahashi et al.

(10) Patent No.: US 9,097,847 B2
(45) Date of Patent: Aug. 4, 2015

(54) RAMAN SCATTERING PHOTOENHANCEMENT DEVICE, METHOD FOR MANUFACTURING RAMAN SCATTERING PHOTOENHANCEMENT DEVICE, AND RAMAN LASER LIGHT SOURCE USING RAMAN SCATTERING PHOTOENHANCEMENT DEVICE

(71) Applicant: Japan Science and Technology Agency, Kawaguchi-shi, Saitama (JP)

(72) Inventors: Yasushi Takahashi, Sakai (JP); Yoshitaka Inui, Kyoto (JP); Takashi Asano, Kyoto (JP); Susumu Noda, Kyoto (JP); Masahiro Chihara, Sakai (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 14/370,997

(22) PCT Filed: Mar. 8, 2013

(86) PCT No.: PCT/JP2013/056523
§ 371 (c)(1),
(2) Date: Jul. 8, 2014

(87) PCT Pub. No.: WO2014/030370
PCT Pub. Date: Feb. 27, 2014

(65) Prior Publication Data
US 2014/0355630 A1    Dec. 4, 2014

(30) Foreign Application Priority Data

Aug. 24, 2012   (JP) ................. 2012-185638

(51) Int. Cl.
*H01S 3/30*    (2006.01)
*G02B 6/122*   (2006.01)
(Continued)

(52) U.S. Cl.
CPC .............. *G02B 6/1225* (2013.01); *G02B 6/13* (2013.01); *G02F 1/025* (2013.01); *G02F 1/365* (2013.01);
(Continued)

(58) Field of Classification Search
CPC ............. G02F 1/35; G02F 1/365; H01S 3/30; H01S 5/105; H01S 5/18319; H01S 3/302; H01S 3/108; H01S 3/1112
USPC ............................................................. 372/3
See application file for complete search history.

(56) References Cited

U.S. PATENT DOCUMENTS

2004/0165850 A1    8/2004  Noda et al.
2006/0050744 A1*   3/2006  Wong et al. ................. 372/3
(Continued)

FOREIGN PATENT DOCUMENTS

JP    2000-133867 A    5/2000
JP    2008-241796 A   10/2008
(Continued)

OTHER PUBLICATIONS

Masahiro Chihara et al., "Hetero Kozo Nano Kyoshinki no Ko Energy Mode kara no Raman Sanran Spectrum (2) [Raman Scattering Spectrum from a High Energy Mode of a Hetero Structured Nano Resonator (2)]," Extended Abstracts, Japan Society of Applied Physics, vol. 72nd, Aug. 16, 2011, p. 04-024, ROMBUNNO, 31p-ZR-2.
(Continued)

*Primary Examiner* — Tod T Van Roy
*Assistant Examiner* — Vu A Vu

(57) ABSTRACT

A Raman scattered light enhancement device including a waveguide provided in a photonic crystal (20) made of a semiconductor substrate in which holes (20a) are formed. The waveguide has resonant modes with respect to incident light at a plurality of frequencies. A difference in frequency between one resonant mode and another resonant mode is equal to a Raman shift frequency of the semiconductor substrate. A waveguide forming direction with respect to a crystal plane orientation of the semiconductor substrate is set so as to maximize a Raman transition probability which is represented by electromagnetic field distribution of the two resonant modes and a Raman tensor of the semiconductor substrate.

12 Claims, 14 Drawing Sheets

(51) Int. Cl.
*G02F 1/365* (2006.01)
*G02F 1/025* (2006.01)
*G02B 6/13* (2006.01)
*H01S 3/063* (2006.01)
*H01S 3/0941* (2006.01)

(52) U.S. Cl.
CPC .............. *H01S 3/30* (2013.01); *G02F 2202/10* (2013.01); *G02F 2202/32* (2013.01); *G02F 2203/15* (2013.01); *H01S 3/0635* (2013.01); *H01S 3/0637* (2013.01); *H01S 3/09415* (2013.01)

(56) References Cited

U.S. PATENT DOCUMENTS

| | | | | |
|---|---|---|---|---|
| 2006/0164635 | A1* | 7/2006 | Islam et al. | 356/301 |
| 2007/0252981 | A1 | 11/2007 | Spillane et al. | |
| 2007/0297722 | A1 | 12/2007 | Noda et al. | |
| 2011/0147344 | A1* | 6/2011 | Wong et al. | 216/24 |

FOREIGN PATENT DOCUMENTS

| | | |
|---|---|---|
| TW | 200428730 A | 12/2004 |
| WO | 2005/022220 A1 | 3/2005 |

OTHER PUBLICATIONS

Masahiro Chihara et al., "Hetero Kozo Nano Kyoshinki no Ko Energy Mode kara no Raman Sanran Spectrum [Raman Scattering Spectrum from a High Energy Mode of a Hetero Structured Nano Resonator]," Extended Abstracts, Japan Society of Applied Physics and Related Societies, vol. 58th, Mar. 9, 2011, p. 04-040, ROMBUNNO, 26p-KA-7.

Michael Krause et al., "Nonreciprocal Raman Scattering in Silicon Waveguides", Group IV Photonics (GFP), 2010 7th IEEE International Conference on, !IEEE, Piscataway, NJ, USA, Sep. 1, 2010, pp. 165-167, XP031806926, ISBN: 978-1-4244-6344-2.

E. Lea and B.L Weiss, "Modelling and characteristics of photoelastic waveguides in Si1-xGex/Si heterostructures", IEE Proceedings: Optoelectronics, Institution of Electrical Engineers, Stevenage, GB, vol. 147, No. 2, Apr. 17, 2000, pp. 123-131, XP006014343, ISSN: 1350-2433, DOI: 10.1049/ip-opt:20000281.

Yasushi Takahashi et al., "First Observation of Raman Scattering Emission from Silicon High-Q Photonic Crystal Nanocavities", Lasers and Electro-Optics (CLEO), Laser Science to Photonic Applications—CLEO: 2011—Laser Science to Photonic Applications—May 1-6, 2011, Baltimore, MD, USA, IEEE, US, May 1, 2011, pp. 1-2 XP031892662, ISBN: 978-1-4577-1223-4.

M.G. Banaee and Jeff F. Young, "Squeezed state generation in photonic crystal microcavities", Optics Express, vol. 16, No. 25, pp. 20908-20919 (2008), OSA.

European Patent Office, Extended European Search Report, issued in EP Patent Application No. EP13 83 1618.7, which is a European counterpart of U.S. Appl. No. 14/370,997, with an issuance date of Oct. 23, 2014, 8 pages.

Taiwan Patent Office, Office Action and Search Report, issued in TW Patent Application No. 102108274, which is a Taiwanese counterpart of U.S. Appl. No. 14/370,997, mailed on Dec. 8, 2014 (1 page of English Translation of Search Report, 6 pages of Office Action and 1 page of Search Report).

Yasushi Takahashi et al., "A micrometre-scale Raman silicon laser with a microwatt threshold", Nature, vol. 498, No. 7455, pp. 470-474 (Jun. 27, 2013), Macmillan Publishers Limited.

The International Bureau of WIPO, "Notification Concerning Documents Transmitted: Written Opinion of the International Searching Authority," issued in International Application No. PCT/JP2013/056523, of which U.S. Appl. No. 14/370,997 is a U.S. national phase entry, with a date of mailing of Aug. 8, 2014.

\* cited by examiner

Ex
x DIRECTION EVEN FUNCTION
y DIRECTION EVEN FUNCTION

Ey
x DIRECTION ODD FUNCTION
y DIRECTION ODD FUNCTION

Hz
x DIRECTION EVEN FUNCTION
y DIRECTION ODD FUNCTION

Ex
x DIRECTION ODD FUNCTION
y DIRECTION ODD FUNCTION

Ey
x DIRECTION EVEN FUNCTION
y DIRECTION EVEN FUNCTION

Hz
x DIRECTION ODD FUNCTION
y DIRECTION EVEN FUNCTION

Fig. 7

$$R_{ij}^{(1)} = \begin{pmatrix} 0 & 1 & 0 \\ 1 & 0 & 0 \\ 0 & 0 & 1 \end{pmatrix}$$

$$R_{ij}^{(2)} = \begin{pmatrix} 0 & 0 & 1 \\ 0 & 0 & 0 \\ 1 & 0 & 0 \end{pmatrix}$$

$$R_{ij}^{(3)} = \begin{pmatrix} 0 & 0 & 0 \\ 0 & 0 & 1 \\ 0 & 1 & 0 \end{pmatrix}$$

Fig. 8

$$R_{ij}^{(1)} = \begin{pmatrix} 1 & 0 & 0 \\ 0 & -1 & 0 \\ 0 & 0 & 0 \end{pmatrix}$$

$$R_{ij}^{(2)} = \frac{1}{\sqrt{2}} \begin{pmatrix} 0 & 0 & 1 \\ 0 & 0 & -1 \\ 1 & -1 & 0 \end{pmatrix}$$

$$R_{ij}^{(3)} = \frac{1}{\sqrt{2}} \begin{pmatrix} 0 & 0 & 1 \\ 0 & 0 & 1 \\ 1 & 1 & 0 \end{pmatrix}$$

RAMAN SCATTERING PHOTOENHANCEMENT DEVICE, METHOD FOR MANUFACTURING RAMAN SCATTERING PHOTOENHANCEMENT DEVICE, AND RAMAN LASER LIGHT SOURCE USING RAMAN SCATTERING PHOTOENHANCEMENT DEVICE

CROSS REFERENCE TO RELATED APPLICATIONS

This patent application is a U.S. national stage application under 35 U.S.C. §371 of International Patent Application No. PCT/JP2013/056523 filed on Mar. 8, 2013, which claims the benefit of foreign priority to Japanese Patent Application No. JP 2012-185638 filed on Aug. 24, 2012, the disclosures of all of which are hereby incorporated by reference in their entireties. The International Application was published in Japanese on Feb. 27, 2014, as International Publication No. WO 2014/030370 A1 under PCT Article 21(2).

TECHNICAL FIELD

The present invention relates to a Raman scattered light enhancement device, and particularly to a Raman scattered light enhancement device applicable to an optical waveguide or an optical resonator using a photonic crystal made up of a semiconductor substrate in which holes are formed, and a method for manufacturing the Raman scattered light enhancement device. The present invention also relates to a Raman laser light source using the Raman scattered light enhancement device.

BACKGROUND ART

Patent Literature 1 discloses a Raman scattered light enhancement device formed such that stimulated Raman scattering can be generated in a slab-type two-dimensional photonic crystal where a number of holes are formed in a slab made of silicon so as to have a two-dimensional periodic structure. The Raman scattered light enhancement device of Patent Literature 1 has an in-plane heterostructure formed by combining two-dimensional photonic crystals each having different structural parameters, and realizes optical confinement using a difference in mode gaps due to the difference of the structural parameters.

In the Raman scattered light enhancement device of Patent Literature 1, there is provided an optical resonator configured of a waveguide made up of a linear defect formed in the photonic crystal, and there are provided two reflection parts so as to realize resonant modes for each of a wavelength of incident light and a wavelength of Raman scattered light of an object medium.

CITATION LIST

Patent Literature

PTL 1: JP 2008-241796 A

SUMMARY OF INVENTION

Technical Problem

According to the Raman scattered light enhancement device disclosed in Patent Literature 1, Raman light that occurs due to stimulated Raman scattering can be strongly confined within a predetermined region by the optical resonator, and Raman scattered light can thus be obtained with high efficiency. Such a Raman scattered light enhancement technique is attracting attention as one which leads to a Raman laser using a photonic crystal to be realized in the future. The Raman laser using a photonic crystal has been expected to be put into practice as a technique capable of obtaining laser light in a wavelength region which cannot be dealt with by a conventional semiconductor laser, or as a technique capable of creating laser light even by indirect transition-type semiconductor such as silicon. However, it is known that the Raman scattered light generally has very low intensity, and even by use of the Raman scattered light enhancement device of Patent Literature 1, laser oscillation with a low threshold is difficult to realize. There has thus been required an enhancement device for obtaining stronger Raman scattered light.

Incidentally, in the case of producing a Raman scattered light enhancement device as in Patent Literature 1 on a silicon substrate, the [110] direction where cleavage occurs easily, or an equivalent direction thereto, is generally used. In contrast, as a result of intensive research, the present inventors focus their attention on the fact that the intensity of Raman scattered light (Raman transition probability) depends on a crystal plane orientation of a material substrate, and propose a technique capable of obtaining stronger Raman scattered light from a new viewpoint completely different from the conventional technique.

An object of the present invention is to provide a Raman scattered light enhancement device capable of obtaining stronger Raman scattered light by optimizing a waveguide forming direction, and a method for manufacturing the Raman scattered light enhancement device.

Solution to Problem

In an embodiment, a Raman scattered light enhancement device includes a waveguide provided in a photonic crystal made of a semiconductor substrate in which holes are formed. The waveguide has resonant modes with respect to incident light at a plurality of frequencies. A difference in frequency between one resonant mode and another resonant mode is equal to a Raman shift frequency of the semiconductor substrate, and a waveguide forming direction with respect to a crystal plane orientation of the semiconductor substrate is set so as to maximize a Raman transition probability which is represented by electromagnetic field distribution of the two resonant modes and a Raman tensor of the semiconductor substrate.

In the embodiment, the two resonant modes are a ground waveguide mode and a first excitation waveguide mode.

In the embodiment, the semiconductor substrate is silicon, and the waveguide forming direction with respect to the crystal plane orientation of the semiconductor substrate is a direction of crystal orientation [100], or a plane orientation equivalent thereto, of the silicon.

In the embodiment, the waveguide is made up of a linear defect formed in the photonic crystal and provided with an optical resonator having a pair of light reflecting interfaces, around which structure of the photonic crystal is altered so that a light propagation wavelength band is shifted along the waveguide.

In the embodiment, the pair of light reflecting interfaces reflect both light of the ground waveguide mode and light of the first excitation waveguide mode.

In the embodiment, a Raman laser light source includes: the Raman scattered light enhancement device; and a pumping light source. The Raman scattered light enhancement device includes a waveguide provided in a photonic crystal made of a semiconductor substrate in which holes are formed. The waveguide has resonant modes with respect to incident light at a plurality of frequencies. A difference in frequency between one resonant mode and another resonant mode is equal to a Raman shift frequency of the semiconductor substrate, and a waveguide forming direction with respect to a crystal plane orientation of the semiconductor substrate is set so as to maximize a Raman transition probability which is represented by electromagnetic field distribution of the two resonant modes and a Raman tensor of the semiconductor substrate. The waveguide is made up of a linear defect formed in the photonic crystal and provided with an optical resonator having a pair of light reflecting interfaces, around which structure of the photonic crystal is altered so that a light propagation wavelength band is shifted along the waveguide. The pair of light reflecting interfaces reflect both light of the ground waveguide mode and light of the first excitation waveguide mode. The pumping light source outputs the light of the first excitation waveguide mode. The light of the first excitation waveguide mode outputted by the pumping light source is inputted into the optical resonator of the Raman scattered light enhancement device.

In the embodiment, the pumping light source may be a laser light source.

In the embodiment, the pumping light source may be a light-emitting diode.

In the embodiment, the pumping light source may be formed on the semiconductor substrate where the photonic crystal is formed.

In an embodiment, a method for manufacturing a Raman scattered light enhancement device is a manufacturing method of a Raman scattered light enhancement device including a waveguide provided in a photonic crystal made of a semiconductor substrate in which holes are formed, and the waveguide has resonant modes with respect to incident light at a plurality of frequencies. The method for manufacturing the Raman scattered light enhancement device includes: setting a size and arrangement of the holes of the photonic crystal so as to equalize a difference in frequency between one resonant mode and another resonant mode to a Raman shift frequency of the semiconductor substrate; and setting a waveguide forming direction on a crystal plane orientation of the semiconductor substrate so as to maximize a Raman transition probability which is represented by electromagnetic field distribution of the two resonant modes and a Raman tensor of the semiconductor substrate.

Advantageous Effects of Invention

According to the present invention, a forming direction of a waveguide is optimized. It makes possible to obtain stronger Raman scattered light, and can lead to a continuous oscillation of a Raman laser, size minimization, electric power saving, and low cost mass-production.

BRIEF DESCRIPTION OF DRAWINGS

FIGS. 4A to 4C illustrate states of the electromagnetic field of a first excitation waveguide mode, which confines pumping light. FIGS. 4D to 4F illustrate states of the electromagnetic field of a ground waveguide mode, which confines Raman scattered light.

FIG. 7 is a diagram showing a Raman tensor in the case where a waveguide forming direction is [100].

FIG. 8 is a diagram showing a Raman tensor in the case where a waveguide forming direction is [110].

DESCRIPTION OF EMBODIMENTS (First Embodiment)

Hereinafter, a description will be given to an optical resonator 100 as an example of a Raman scattered light enhancement device with reference to the attached drawings.

(1. Configuration of Optical Resonator)

Figure 1:
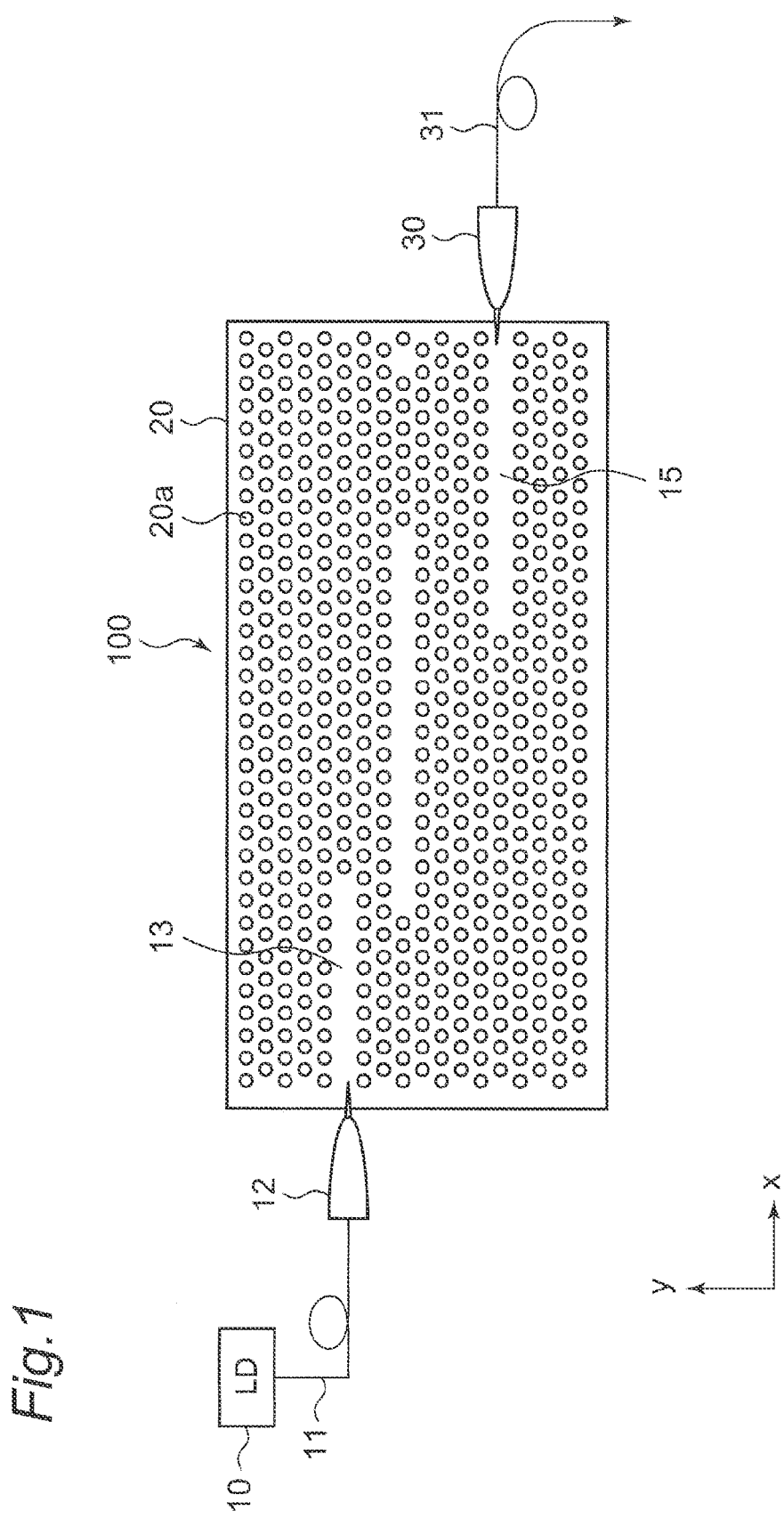
FIG. 1 is a diagram schematically illustrating a configuration of an optical resonator according to an embodiment.

FIG. 1 is a diagram illustrating a schematic configuration of an optical resonator 100 using a two-dimensional photonic crystal 20. The two-dimensional photonic crystal 20 has a structure where a large number of holes 20a are arrayed in silicon. The optical resonator 100 has a configuration where, when laser light (wavelength: 1435 nm) emitted from a laser diode (LD) 10 via a lens fiber 11 is incident on an input waveguide 13 from a light inputting device 12, laser light with a new wavelength (wavelength: about 1550 nm) is collected at a light outputting device 30 via an output waveguide 15, and guided to a lens fiber 31.

Figure 2:
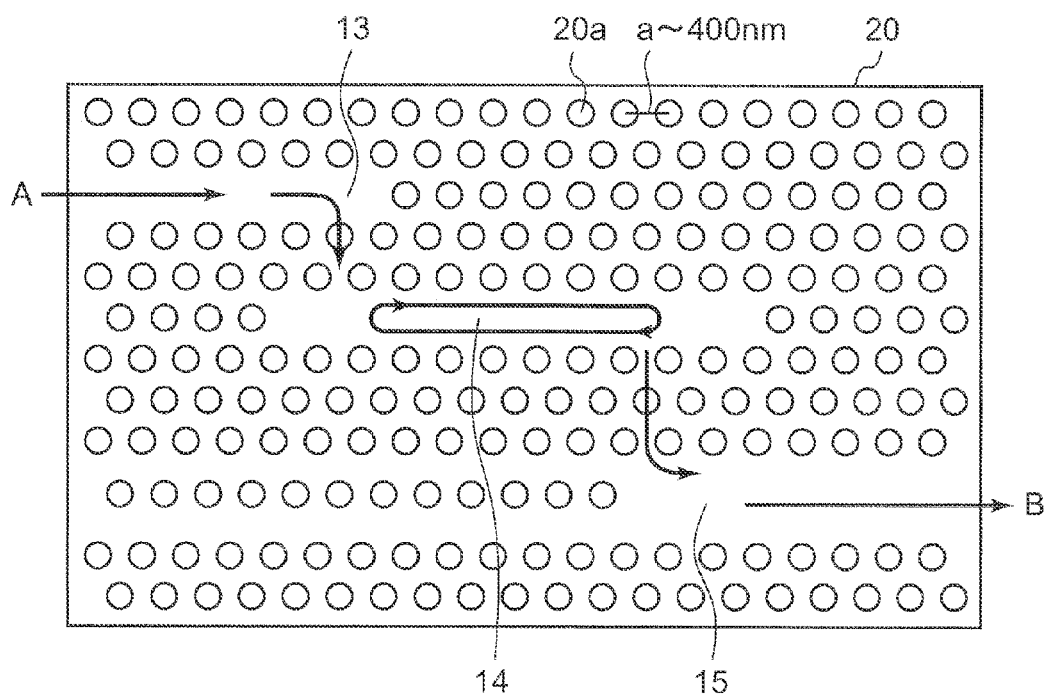
FIG. 2 is a diagram schematically illustrating a configuration of a two-dimensional photonic crystal.

As enlarged and shown in FIG. 2, the two-dimensional photonic crystal 20 has a structure where the holes 20a are periodically provided on a slab-type silicon substrate. When laser light for excitation is incident on the input waveguide 13 along an A-direction, the wavelength is converted by the stimulated Raman scattering in a micro-resonator 14 being centered at the figure, and laser light with a new wavelength is emitted along a B-direction via the output waveguide 15. An interval between the holes 20a in the two-dimensional photonic crystal 20 is about 400 nm except for a region in the vicinity of the micro-resonator 14, whereas in the region in the vicinity of the micro-resonator 14, positions of the holes are finely adjusted so as to realize optical confinement using a mode gap difference.

That is, in the two-dimensional photonic crystal 20, optical resonance is realized by a waveguide made of a linear defect formed in the photonic crystal. The optical resonance is realized by providing a pair of light reflecting interfaces around which structure of the photonic crystal is altered so that a propagation wavelength band is shifted in the middle of the waveguide. Specifically, by changing the size of the holes of the photonic crystal in the region of the light reflecting interface or slightly changing positions and an interval of the holes (e.g., getting the hole closer to or more distant from the waveguide), the structure of the peripheral photonic crystal can be altered.

Figure 3:
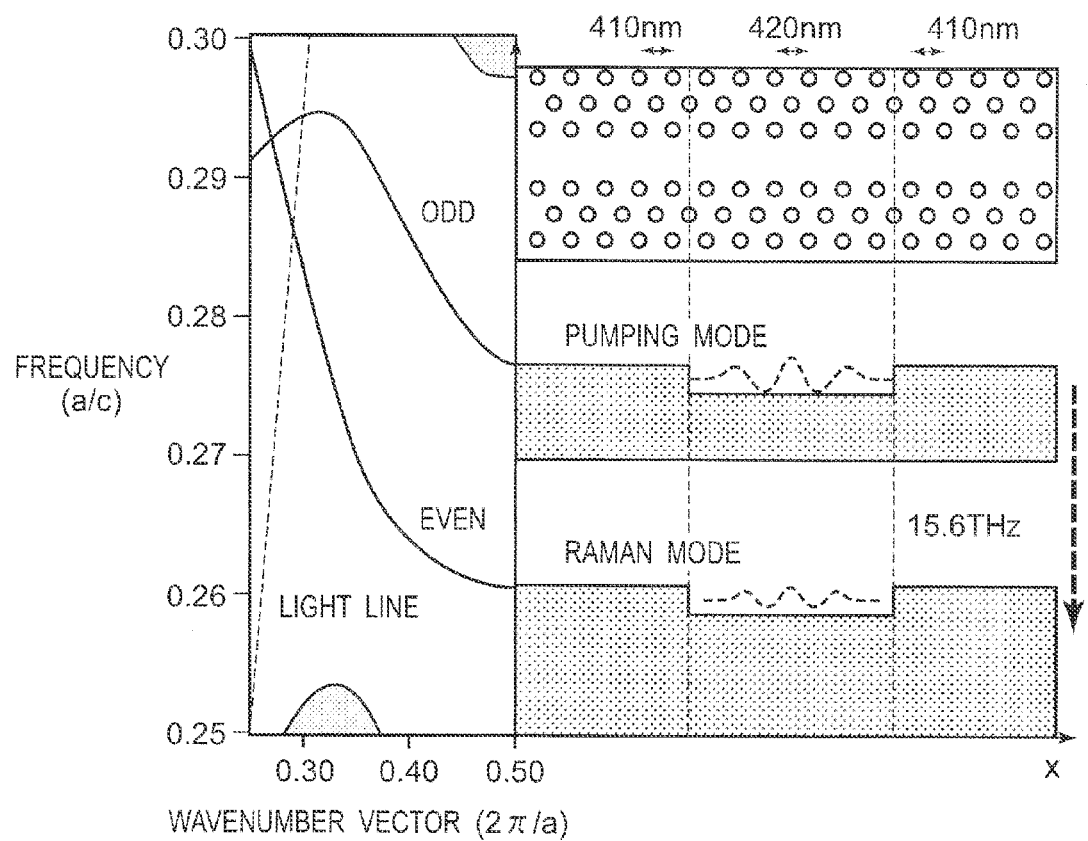
FIG. 3 is an enlarged view of the central portion of the two-dimensional photonic crystal, in which its waveguide modes are illustrated.

FIG. 3 shows an enlarged structure of a photonic crystal in the vicinity of the micro-resonator 14 of the two-dimensional photonic crystal 20, in which states of the resonant modes are depicted. Since a frequency of the resonant mode depends on an effective refractive index, as shown in FIG. 3, in the two-dimensional photonic crystal 20, positions of holes around the micro-resonator 14 are modulated so that a hetero structure is formed where intervals between the holes are altered for respective regions as 410 nm, 420 nm, and 410 nm.

As shown in FIG. 3, in the regions where such modulation has been applied, there exist a "pumping mode" (first excitation waveguide mode) having a higher energy level and a "Raman mode" (ground waveguide mode) having an energy level decreased from the above level by 15.6 THz (Raman shift frequency of silicon), and potential wells are formed for the respective energy levels.

Optical confinement occurs due to this well-type potential. As shown in a left-side region (band diagram in wavenumber space) of FIG. 3, where the vertical axis is a frequency and the horizontal axis is a wavenumber vector, the energy levels mentioned above have the "pumping mode" (first excitation waveguide mode), which shows an odd parity of a magnetic field component in a vertical direction with respect to the central axis of the waveguide, and the "Raman mode" (ground waveguide mode), which shows an even parity of a magnetic field component in the vertical direction with respect to the central axis of the waveguide.

The two-dimensional photonic crystal 20 is designed to be used for resonation between pumping light and Raman scattered light by finely adjusting the position and diameter of each hole 20a around the waveguide so that respective frequencies of the ground waveguide mode and the first excitation waveguide mode are adjusted. For example, positions of respective holes 20a around the waveguide are made slightly close to or distant from the waveguide, intervals between the holes 20a are altered, or diameters of the holes 20a are altered. It is to be noted that, in actually performing such fine adjustment, a relatively easier approach is: producing a large number of samples by gradually changing diameters of holes and selecting a sample where the frequency difference between the ground waveguide mode and the first excitation waveguide mode agrees with the Raman shift frequency.

In the two-dimensional photonic crystal 20 of the present embodiment, in order to prevent escape of generated Raman scattered light to the outside and effectively confine and use it, two pairs of reflection parts are not provided as in Patent Literature 1, but a configuration has been adopted where pumping light and Raman scattered light are both reflected by a single pair of reflection parts. Accordingly, spatial overlapping of the pumping light and the Raman scattered light becomes greater, and, hence, Q values of the waveguide modes for the pumping light and the Raman scattered light can each be made to be such a high value as not smaller than 1 million. Further, there is an advantage of being able to easily realize the frequency difference of 15.6 THz all around the entire optical communication band (1.3 to 1.6 micrometers) without impairing the above advantage, namely, without impairing a high degree of freedom in wavelength design.

Figure 4A:
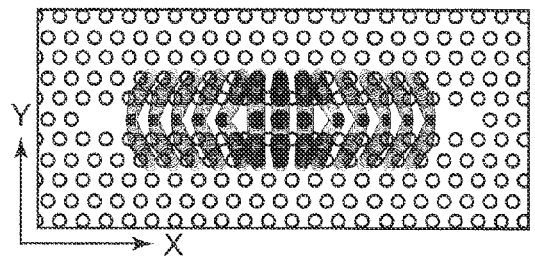
FIGS. 4A to 4F are diagrams illustrating states of electromagnetic fields of resonant modes attributable to two waveguide modes (levels) formed in the two-dimensional photonic crystal.
Figure 4B:
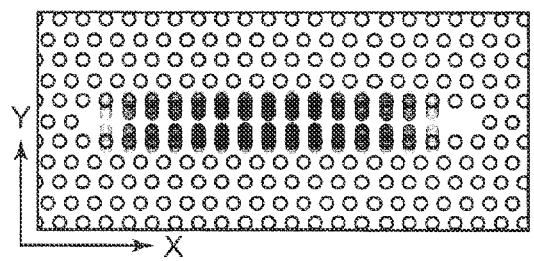
Figure 4C:
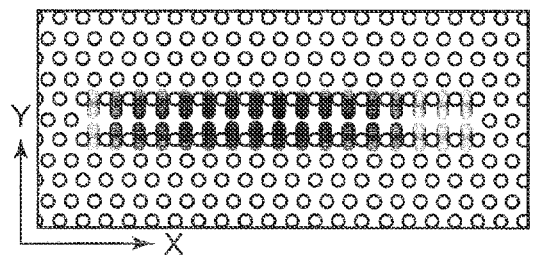
Figure 4D:
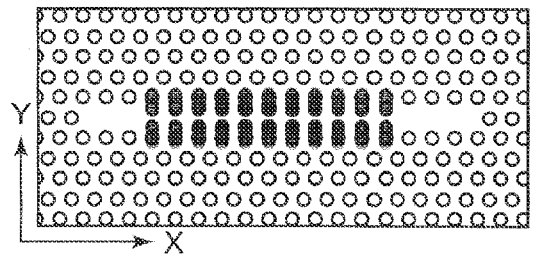
Figure 4E:
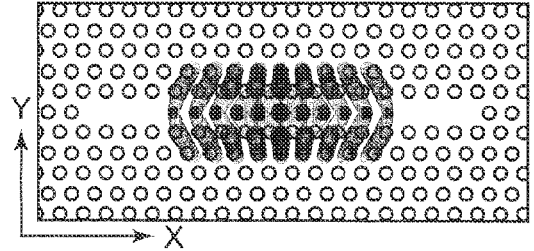
Figure 4F:
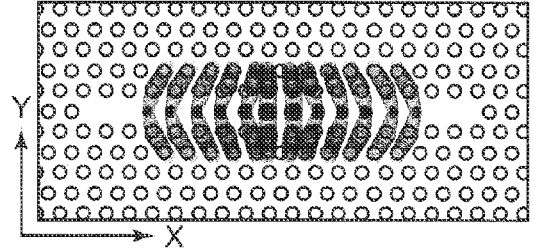

FIGS. 4A to 4F are ones showing states of an electromagnetic field in each of the two waveguide modes (levels) formed in the two-dimensional photonic crystal 20, where dark colored portions indicate that the electromagnetic field is strong. FIGS. 4A to 4C are diagrams showing states of the electromagnetic field of the first excitation waveguide mode that confines the pumping light, which represent an electric field component Ex (FIG. 4A), an electric field component Ey (FIG. 4B) and a magnetic field component Hz (FIG. 4C), respectively. FIGS. 4D to 4F are diagrams showing states of the electromagnetic field of the ground waveguide mode that confines the Raman scattered light having lower energy than that of the pumping light, which represent an electric field component Ex (FIG. 4D), an electric field component Ey (FIG. 4E) and a magnetic field component Hz (FIG. 4F), respectively. As described above, the spatial symmetry properties are different between the first excitation waveguide mode and the ground waveguide mode. The parity of the magnetic field component in the vertical direction is odd with respect to the central axis of the waveguide in the first excitation waveguide mode, and the parity of the magnetic field component in the vertical direction is even with respect to the central axis of the waveguide in the ground waveguide mode.

(2.2 Manufacturing Method for Two-dimensional Photonic Crystal)

Next, a method for manufacturing the two-dimensional photonic crystal 20 will be described using FIGS. 5A to 5H. As described later, in the present embodiment, the two-dimensional photonic crystal 20 is produced such that a waveguide forming direction is a direction of a crystal plane orientation of silicon [100] and the first excitation waveguide mode and the ground waveguide mode can be utilized therein.

Figure 5A:
FIGS. 5A to 5H are diagrams of processes illustrating a method for manufacturing the two-dimensional photonic crystal.
Figure 5E:
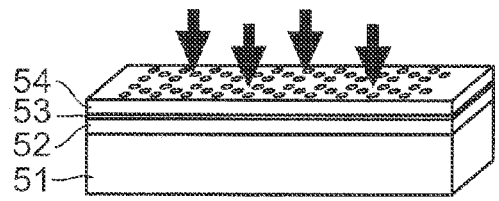
Figure 5B:
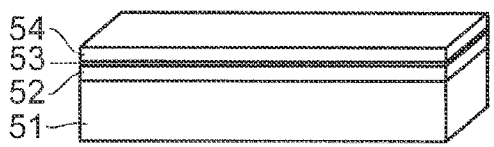
Figure 5F:
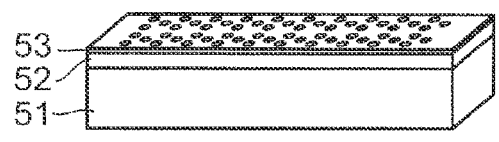
Figure 5C:
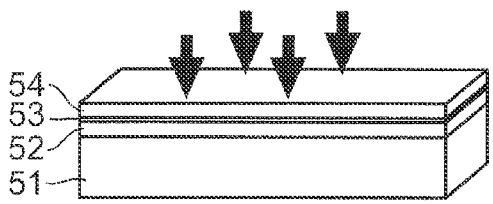
Figure 5G:
Figure 5D:
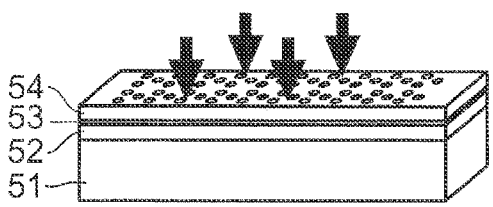
Figure 5H:
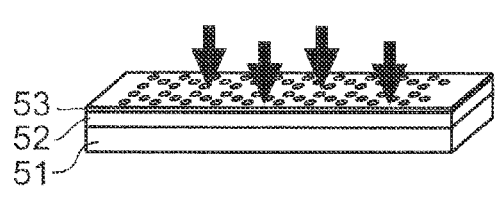

First, as shown in FIG. 5A, a laminated substrate (SOI substrate) made up of a Si layer 51, a $SiO_2$ layer 52 and a Si layer 53 are cleansed. Next, as shown in FIG. 5B, a resist layer 54 is applied onto the laminated substrate, and electron beam lithography is performed as shown in 5C. Subsequently, in a state where the resist layer 54 has been developed and holes are provided thereby as shown in FIG. 5D, ICP etching is performed to transfer a hole pattern of the resist layer 54 to the Si layer 53 as shown in FIG. 5E. Next, after a surface cleansing as shown in FIG. 5F, substrate polishing is performed on the Si layer 51 according to the need as shown in FIG. 5G. Finally, as shown in FIG. 5H, the $SiO_2$ layer 52 is etched by hydrofluoric acid, to complete the two-dimensional photonic crystal 20.

(3. Improvement in Intensity of Raman Scattered Light)

Figure 6:
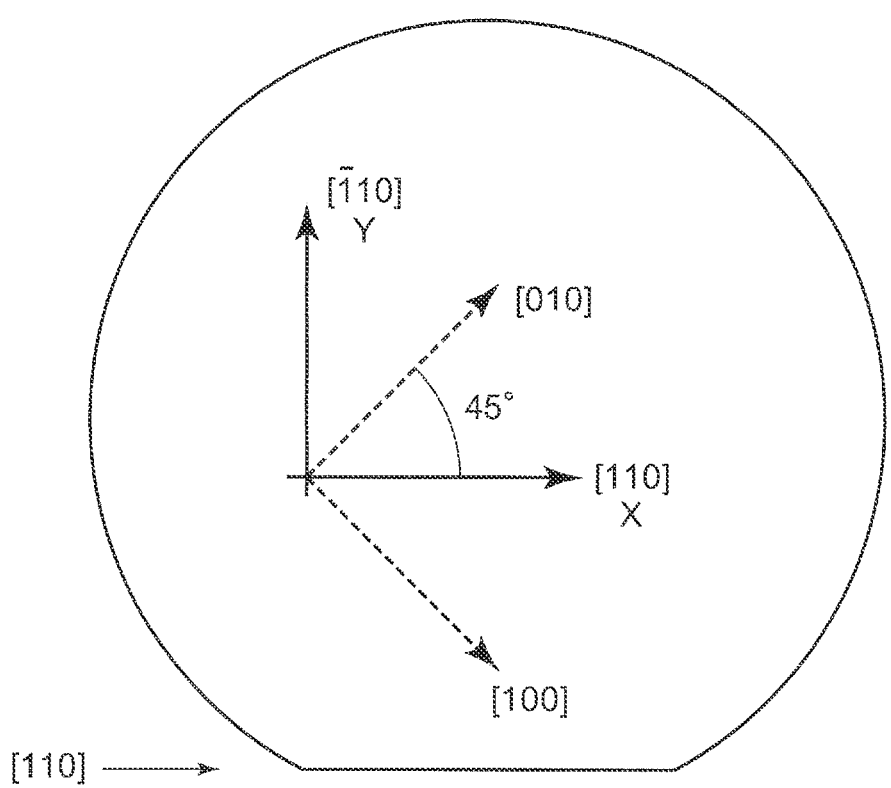
FIG. 6 is a diagram illustrating a plane orientation of a silicon (SOI) substrate.

FIG. 6 is a diagram explaining a plane orientation on the silicon (SOI) substrate. There is a difference in angle of 45 degrees between a [110] orientation and a [010] orientation. An orientation flat is provided in the [110] orientation. Conventionally, when producing a waveguide structure or an optical resonance structure, the structure has been generally provided in the [110] orientation where a waveguide end surface is easily produced by cleavage.

In contrast, as a result of intensive research, the inventors of the present application have focused their attention on the fact that a Raman tensor, which defines the intensity of Raman scattered light, varies its value depending on the crystal plane orientation, and come to propose a technique capable of obtaining stronger Raman scattered light from a new viewpoint completely different from the conventional technique.

Enhancement of Raman scattered light in the present embodiment is realized as follows: on the assumption that the frequency difference between the resonant frequency for the pumping mode and the resonant frequency for the Raman mode should be made to agree with the Raman shift frequency (15.6 THz) of silicon, an electromagnetic field distribution of Raman scattering, which occurs due to interaction of the pumping mode and the phonons of silicon, is made to well agree with electromagnetic field distribution of the resonant mode by considering the spatial symmetry of these two resonant modes and the Raman tensor of silicon.

In other words, in the present embodiment, the frequency difference between one resonant mode and the other resonant mode is made equal to the Raman shift frequency of silicon. Then, in the present embodiment, the waveguide forming direction with respect to the crystal plane orientation of silicon is set so as to maximize a Raman transition probability g which is represented by the electromagnetic field distribution of the two resonant modes and the Raman tensor of silicon.

This Raman transition probability g is proportional to an integral expression of following Equation (1):
[Math. 1]

$$g \propto \int E_{raman} \cdot R_{ij} \cdot E_{pump} dV \qquad \text{Eq.(1)}$$

In Equation (1), $E_{raman}$ represents electromagnetic field distribution of the Raman mode, and $E_{pump}$ represents electromagnetic field distribution of the pumping mode. $R_{ij}$ denotes the Raman tensor. $E_{raman}$ and $E_{pump}$ do not vary with respect to the orientation of crystal along which the waveguide is fabricated, but the Raman tensor varies.

In order to obtain strong Raman scattered light, it is required to make the value of Equation (1) large. For this, it is helpful that the spatial symmetry (even or odd) of electromagnetic field of the Raman scattered light agrees with the spatial symmetry of electromagnetic field of the Raman mode at least. Therefore, in selecting a combination of the resonant modes, an algorithmic selectional rule can be considered in accordance with the Raman tensor. In the present embodiment, the resonant modes that exhibit strong intensity of the Raman scattered light are extracted in accordance with such a selectional rule.

First, in general consideration, resonant modes are classified into four types: a type that shows even symmetry with respect to the x direction and even symmetry with respect to the y direction (type A); a type that shows odd symmetry with respect to the x direction and odd symmetry with respect to the y direction (type B); a type that shows even symmetry with respect to the x direction and odd symmetry with respect to the y direction (type C); and a type that shows odd symmetry with respect to the x direction and even symmetry with respect to the y direction (type D).

Then, spatial symmetry of electric field distribution of the Raman scattering which occurs due to interaction of the pumping mode and phonons of silicon is considered. There exist three kinds of phonons in silicon, which vibrate in the [001], [010], or [100] direction.

In silicon, there is a difference of 45 degrees in rotational angle between the [100] direction and the [110] direction. Then, in a direction forming an angle which is between the [100] direction and the [110] direction, a magnitude of the integral expression of Equation (1) is obtained through superimposition of the [100] direction and the [110] direction, and, hence, Equation (1) surely takes a local maximum value in either at the [100] direction or the [110] direction.

Accordingly, in order to maximize the value of Equation (1), namely, the intensity of the Raman scattered light, a comparison may be made between the Raman transition probability g in the case of the waveguide forming direction being the [100] direction and the Raman transition probability g in the case of the waveguide forming direction being in the [110] direction, and the direction which shows the larger Raman transition probability g may be adopted.

The Raman tensor of silicon in the case of the waveguide forming direction being the [100] direction is expressed as in FIG. 7. In the present embodiment, as for polarization of the pumping mode and the Raman mode, only those parallel to the in-plane of the two-dimensional photonic crystal are considered, and, consequently, only an effect from $R_{ij}^{(1)}$ of the Raman tensor is important among those in FIG. 7. Then, the integral expression of Equation (1) is re-written as follows:
[Math. 2]

$$g \propto \int ((E_{raman})_x (E_{pump})_y + (E_{raman})_y (E_{pump})_x) dV \qquad \text{Eq.(2)}$$

That is, if the waveguide forming direction takes the crystal orientation [100] direction (or an equivalent thereto such as the [010] direction, the [−100] direction, etc.) of silicon, the spatial symmetry of electromagnetic field distribution of the Raman mode is to be the symmetry that has inverted parity of the symmetry with respect to x direction and y direction of the pumping mode.

Accordingly, in the case where the waveguide forming direction is directed to the crystal orientation [100] direction of silicon, the combination of the pumping mode and the Raman mode which can enhance the Raman scattered light includes only four kinds: the type A—the type B; the type B—the type A; the type C—the type D; and the type D—the type C. This is because, in a combination other than those, the integrated value of Equation (2) is 0.

As opposed to this, the Raman tensor of silicon in the case of the waveguide forming direction being the [110] direction is expressed as in FIG. 8. In the present embodiment, as for polarization of the pumping mode and the Raman mode, just those parallel to the in-plane of the two-dimensional photonic crystal are considered, and, consequently, only an effect from $R_{ij}^{(1)}$ of the Raman tensor is important among those in FIG. 8. Then, the integral expression of Equation (1) is re-written as follows:
[Math. 3]

$$g \propto \int ((E_{raman})_x (E_{pump})_x - (E_{raman})_y (E_{pump})_y) dV \qquad \text{Eq.(3)}$$

From Equation (3), when the waveguide forming direction is directed to the crystal orientation [110] direction of silicon, the combination of the pumping mode and the Raman mode which can enhance the Raman scattered light includes only four kinds: the type A—the type A; the type B—the type B; the type C—the type C; and the type D—the type D. This is because, in a combination other than those, the integrated value of Equation (3) is 0.

From these, it is found important to appropriately select the resonant modes to be used for the Raman scattering enhancement with consideration for a Raman tensor inherent in a substance, and set a waveguide forming direction with respect to a crystal plane orientation. Such a consideration is not easily obtained from the findings about an optical fiber for amplifying stimulated Raman scattering. This is because the forms of the Raman tensor are completely different between an optical fiber having an amorphous structure and silicon composed of a single crystal, or the like.

To sum up, two resonant modes, which are used for amplifying the Raman scattering with the use of the two-dimensional photonic crystal 20, firstly should have an appropriate frequency difference (15.6 THz in the case of silicon) agreeing with the phonon frequency (Raman shift frequency). Further, the electromagnetic fields thereof should have appropriate spatial symmetry, and they should be produced in an appropriate crystal orientation. Furthermore, a combination that has a large integrated value of Equation (1) should be selected. In addition, in order to obtain strong Raman scattered light or to realize laser oscillation with a low threshold value in an oscillator structure, it is beneficial that a mode having a high Q value can be realized.

One example of such an optimal pair of resonant modes to satisfy all of these requirements is a combination where the first excitation waveguide mode is selected as the pumping mode, the ground waveguide mode is selected as the Raman mode, and a forming direction of the waveguide is set to the crystal orientation [100] of silicon. The electric field component Ex of the first excitation waveguide mode has even symmetry with respect to the x-direction and the y-direction (the type A), and the electric field component Ex of the ground waveguide mode has odd symmetry with respect to the x-direction and the y-direction (the type B). Hence, the combination corresponds to a combination that increases the integral expression of Equation (1) (Raman transition probability g), when the waveguide is formed in the crystal orientation [100] direction.

As opposed to this, a combination of the resonant modes where the waveguide is formed in the crystal orientation [110] direction of silicon is disadvantageous. This is because, in this case, the intensity of Raman scattered light is not increased unless the combination of the resonant modes is any of the four kinds: the type A—the type A; the type B—the type B; the type C—the type C; and the type D—the type D, as described above. However, the frequency difference of 15.6 THz is difficult to realize between two odd modes since the odd mode of the type A has a flat dispersion curve. Meanwhile, although the even mode exists in a wide frequency range, when a large wavenumber region where the light hardly escapes from a linear defect region along the vertical direction is used, the above frequency difference is difficult to be realized with a wave longer than 1200 nm at which silicon absorption is ignorable. Moreover, when two points with greatly deviated wavenumbers are used, the integrated value of Equation (1) becomes small.

Therefore, considering the Raman frequency (frequency difference) of silicon being 15.6 THz and the overlapping of wavenumbers, it is optimal to use the first excitation waveguide mode (cf. FIG. 4A) as the pumping mode and the ground waveguide mode (cf. FIG. 4B) as the Raman mode, as described above. According to this combination, it is possible to obtain high Q values with a structure as depicted in FIG. 3.

Figure 9:
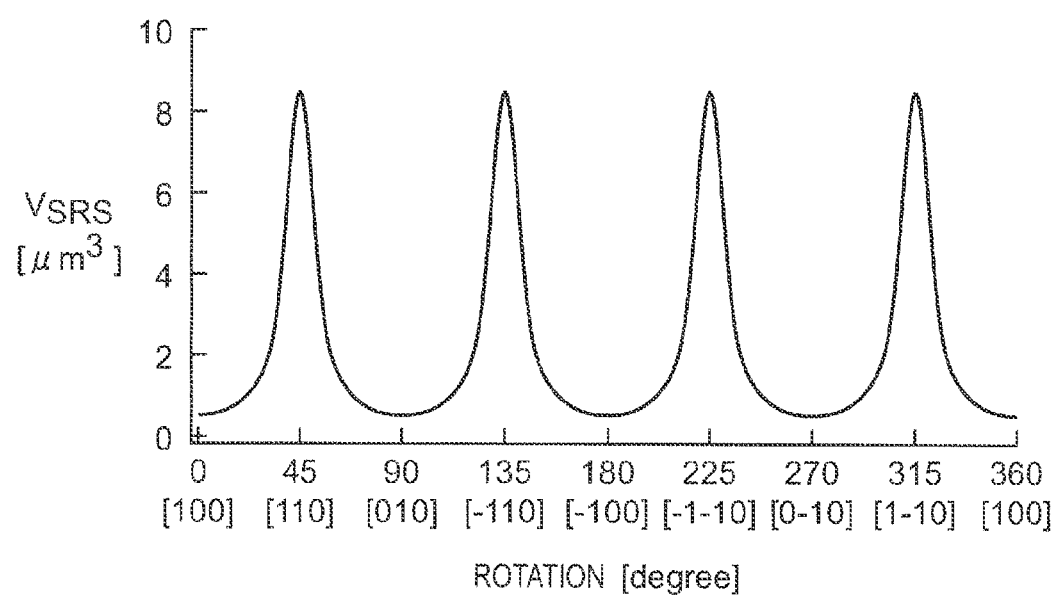
FIG. 9 is a chart showing relationship between a reciprocal of a Raman transition probability and a waveguide forming angle.

FIG. 9 is a graph showing the relation between a reciprocal number of the Raman transition probability g ($V_{SRS}$) and a waveguide forming angle for the above combination. Referring to FIG. 9, the following can be read: the reciprocal number ($V_{SRS}$) of the Raman transition probability g becomes smaller (i.e., the Raman transition probability g becomes larger) when the waveguide forming angle is in the crystal orientation [100] direction of silicon or an equivalent direction thereto, and the reciprocal number ($V_{SRS}$) of the Raman transition probability g becomes larger (i.e., the Raman transition probability g becomes smaller) when the waveguide forming angle is in the crystal orientation [110] direction of silicon or an equivalent direction thereto.

(4. Actual Sample Production)

Figure 10:
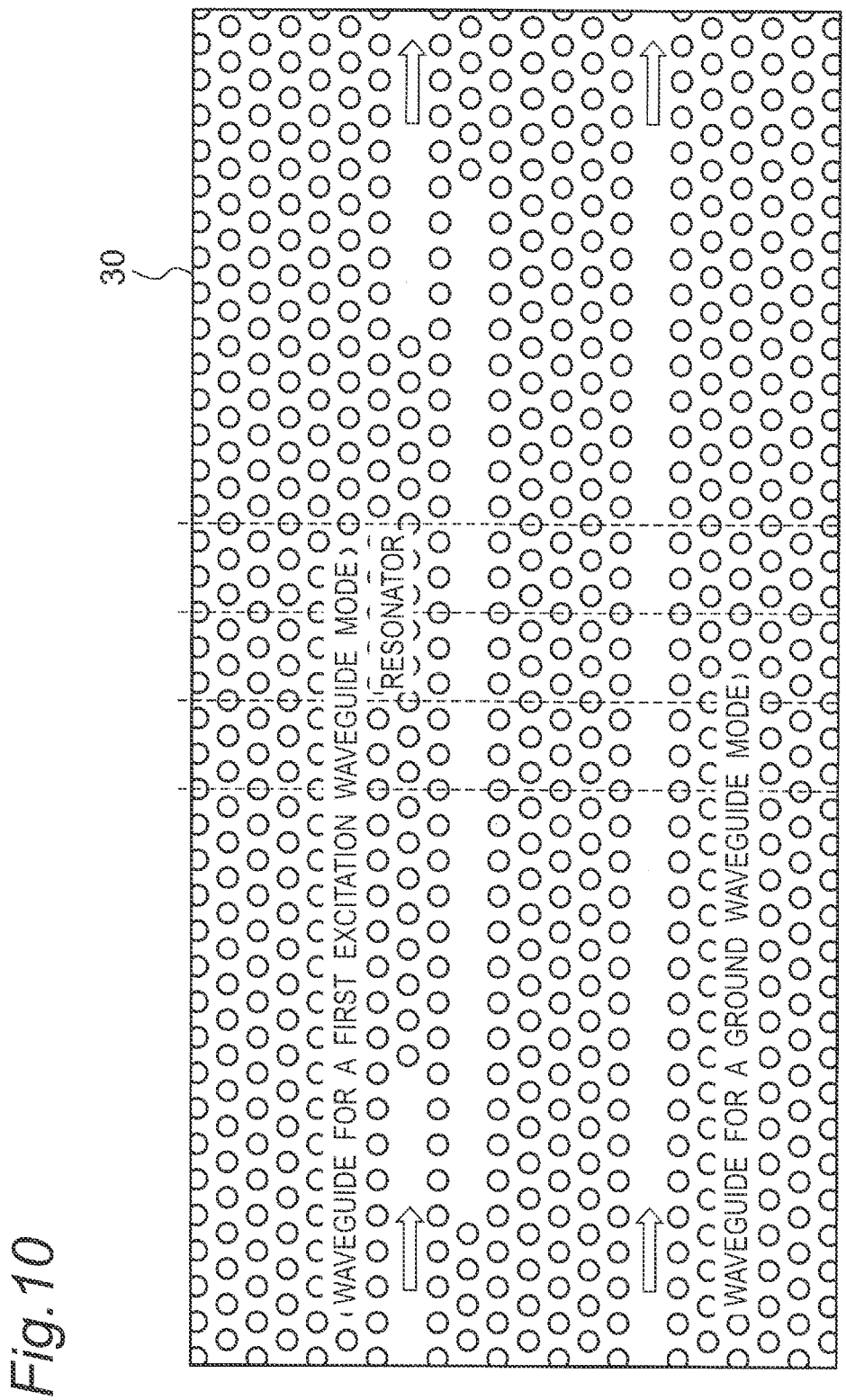
FIG. 10 is a diagram of a sample, in which a waveguide for a first excitation waveguide mode and a waveguide for a ground waveguide mode are arrayed in parallel with a waveguide that forms a micro-resonator working as a device for enhancing Raman scattered light.

FIG. 10 is a schematic diagram of a two-dimensional photonic crystal 30, which is produced by providing respective waveguides for the first excitation waveguide mode and for the ground waveguide mode in the crystal orientation [100] of silicon. In the two-dimensional photonic crystal 30, as an exemplary design aimed at achieving the difference of 15.6 THz, a lattice constant a is set to 410 nm, a hole diameter r is set to 130 nm, and a thickness d of the silicon substrate is set to 220 nm.

Calculated ideal Q values of the first excitation waveguide mode and the ground waveguide mode in the two-dimensional photonic crystal 30 are considered to be on the order of 1.5 million with respect to the first excitation waveguide mode and on the order of 15 million with respect to the ground waveguide mode. These selected modes are considered to be a combination that maximizes the Q value among the modes capable of realizing the Raman shift of silicon of the difference of 15.6 THz. As experimental values of the Q values in an actually sampled two-dimensional photonic crystal 30, the inventors have obtained a value of 0.2 million with respect to the first excitation waveguide mode and 3 million with respect to the ground waveguide mode. Values beyond these have not been reported ever.

The integrated value (Raman transition probability g) of Equation (1) concerning the two-dimensional photonic crystal 30 is on the order of 60% with the holes taken into consideration, and this Raman transition probability g is considered as the highest among those for the possible combinations of the resonant modes. It has actually been confirmed that the two-dimensional photonic crystal in which waveguides are formed in the crystal orientation [100] direction of silicon exhibits stronger intensity of Raman scattered light than the two-dimensional photonic crystal in which waveguides are formed in the crystal orientation [110] direction of silicon.

Figure 11:
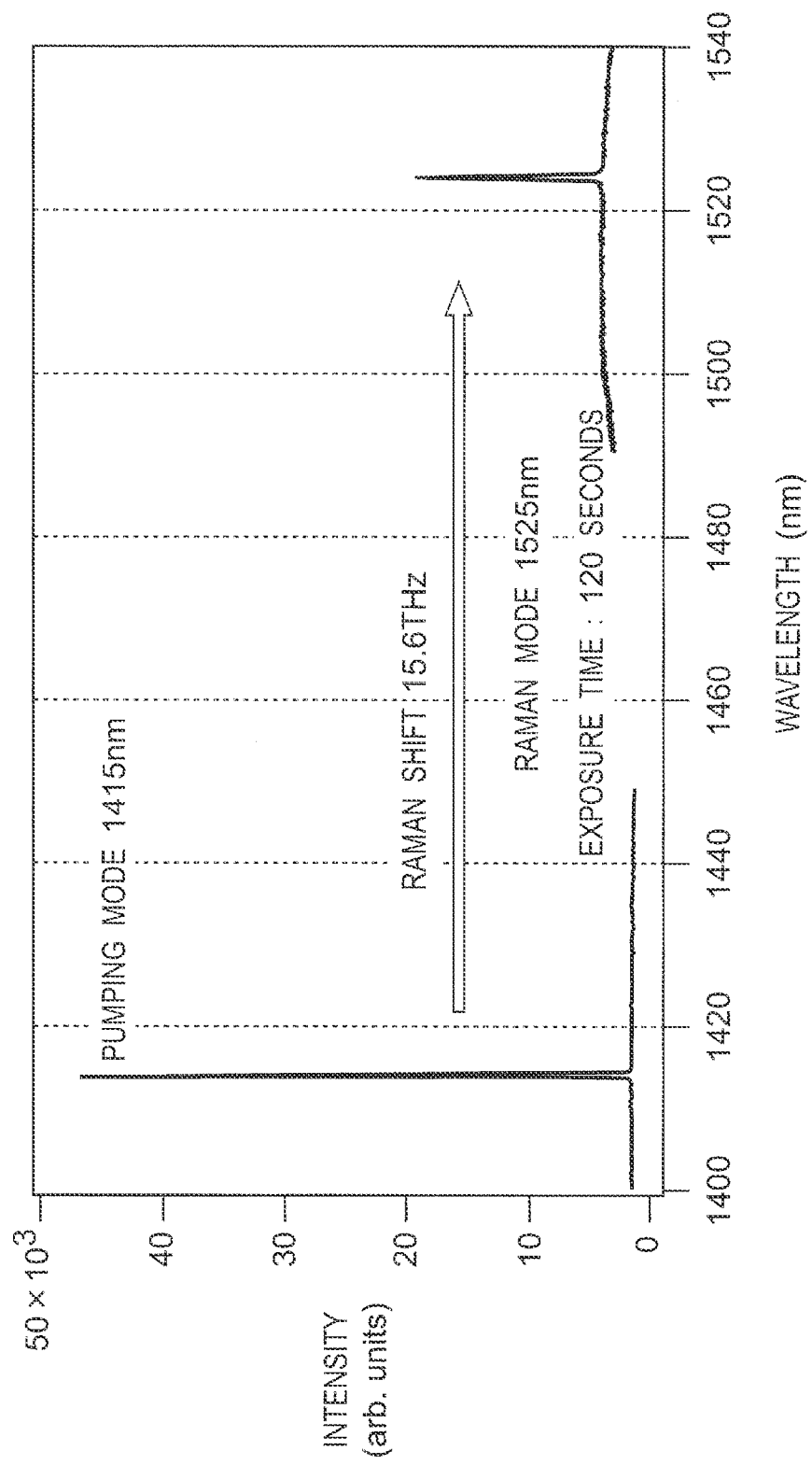
FIG. 11 is a chart of a spectrum of Raman scattered light emitted from a Raman mode when a pumping mode is excited with the use of an external light source.

FIG. 11 shows a result of spectral investigation, in which the pumping light is made incident into the two-dimensional photonic crystal 30 (exposure time: 120 seconds). As shown in FIG. 11, as compared with past cases, a very strong peak of Raman scattered light is obtained. A wavelength of the incident light (pumping mode) is 1415 nm, whereas a wavelength of the Raman scattered light (Raman mode) is 1525 nm, which has been subjected to the Raman shift of 15.6 THz.

(5. Effect)

The effects of the Raman scattered light enhancement device of the present embodiment will be summarized as follows. According to the Raman scattered light enhancement device of the present embodiment, since Raman light generated from pumping light can be effectively enhanced, Raman scattered light stronger than hitherto can be obtained. Being able to obtain strong Raman scattered light thus leads to realization of a power saving Raman laser. Further, differently from the conventional technique, the possibility increases for realizing continuous oscillation of the Raman laser. Moreover, the Raman scattered light enhancement device of the present embodiment is excellent in integration, easy to fabricate, and can be realized at low cost. Additionally, a carrier lifetime of each of free carriers generated due to the pumping light can be expected to be reduced.

(Other Embodiments)

The first embodiment has been described as one exemplary embodiment. However, embodiments are not limited thereto. The following refers to other embodiments.

Figure 12:
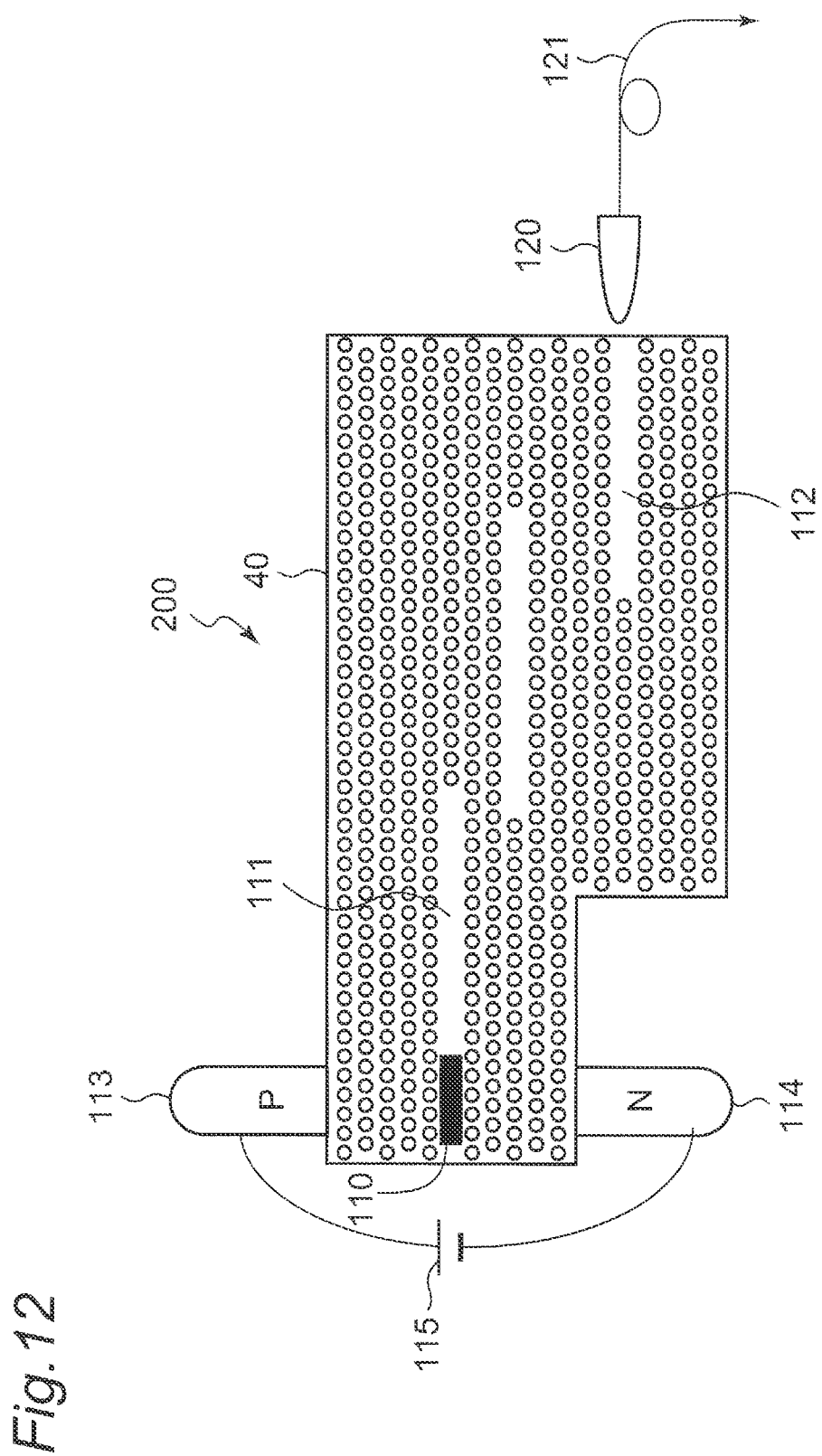
FIG. 12 is a diagram schematically illustrating a configuration of a Raman scattered light enhancement device according to another embodiment.

Although the configuration of the optical resonator 100 using the two-dimensional photonic crystal 20 has been shown in FIG. 1 schematically, an optical resonator 200 may have an integrated configuration where a semiconductor laser is provided on the same substrate as the photonic crystal as shown in FIG. 12. In the optical resonator 200, two-dimensional photonic crystal 40 has a configuration where, when laser light emitted from a laser diode (LD) 110 produced on the same substrate as itself is directly incident on an input waveguide 111, laser light with a new wavelength is collected by a light outputting device 120 via an output waveguide 112 and guided to a lens fiber 121. Further, the laser diode 110 has a configuration where a P-junction 113 and an N-junction 114 are connected to each other via a power source 115. Alternatively, a compound semiconductor laser can be pasted onto silicon, to integrate the laser diode with the photonic crystal.

Figure 13:
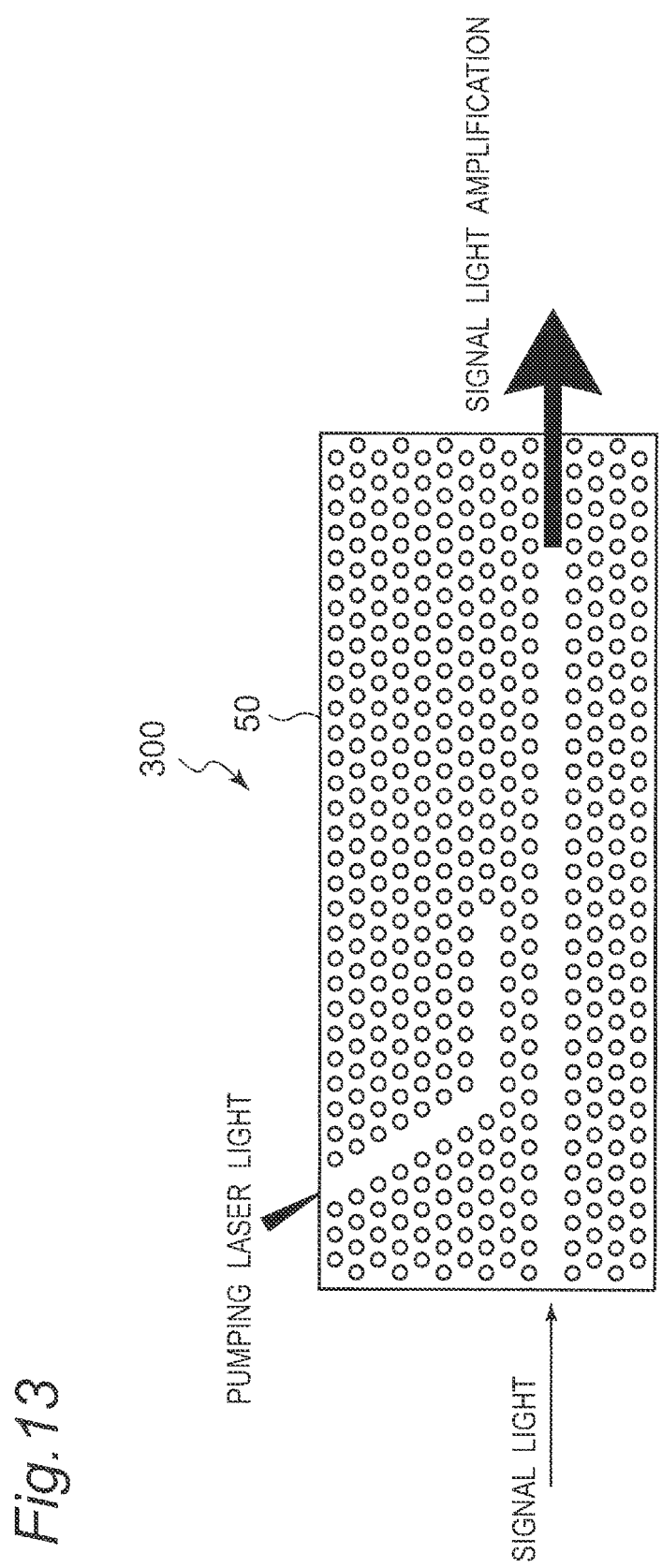
FIG. 13 is a diagram schematically illustrating a configuration of a Raman scattered light enhancement device according to a further embodiment.

Moreover, FIG. 13 shows an optical amplifier 300 as another embodiment of the Raman scattered light enhancement device. The optical amplifier 300 has a waveguide structure in a direction of the crystal orientation [100] of silicon, which does not involve the resonator having a band structure as shown in the left region of FIG. 3. The amplifier 300 employs a two-dimensional photonic crystal 50. To introduce pumping light into the waveguide, a waveguide for pumping is formed in the two-dimensional photonic crystal 50. It is possible to make the foregoing integrated value (Raman transition probability g) of Equation (1) large and obtain optical amplification due to strong stimulated Raman scattering.

It is to be noted that, although silicon has been cited as an example of semiconductor for fabricating the photonic crystal in the foregoing embodiments, the example of semiconductor is not limited thereto, but germanium, diamond or the like which has the same crystal structure as that of silicon can also be used. Further, appropriate doping may be performed on silicon or germanium.

(Raman Laser Light Source)

Figure 14:
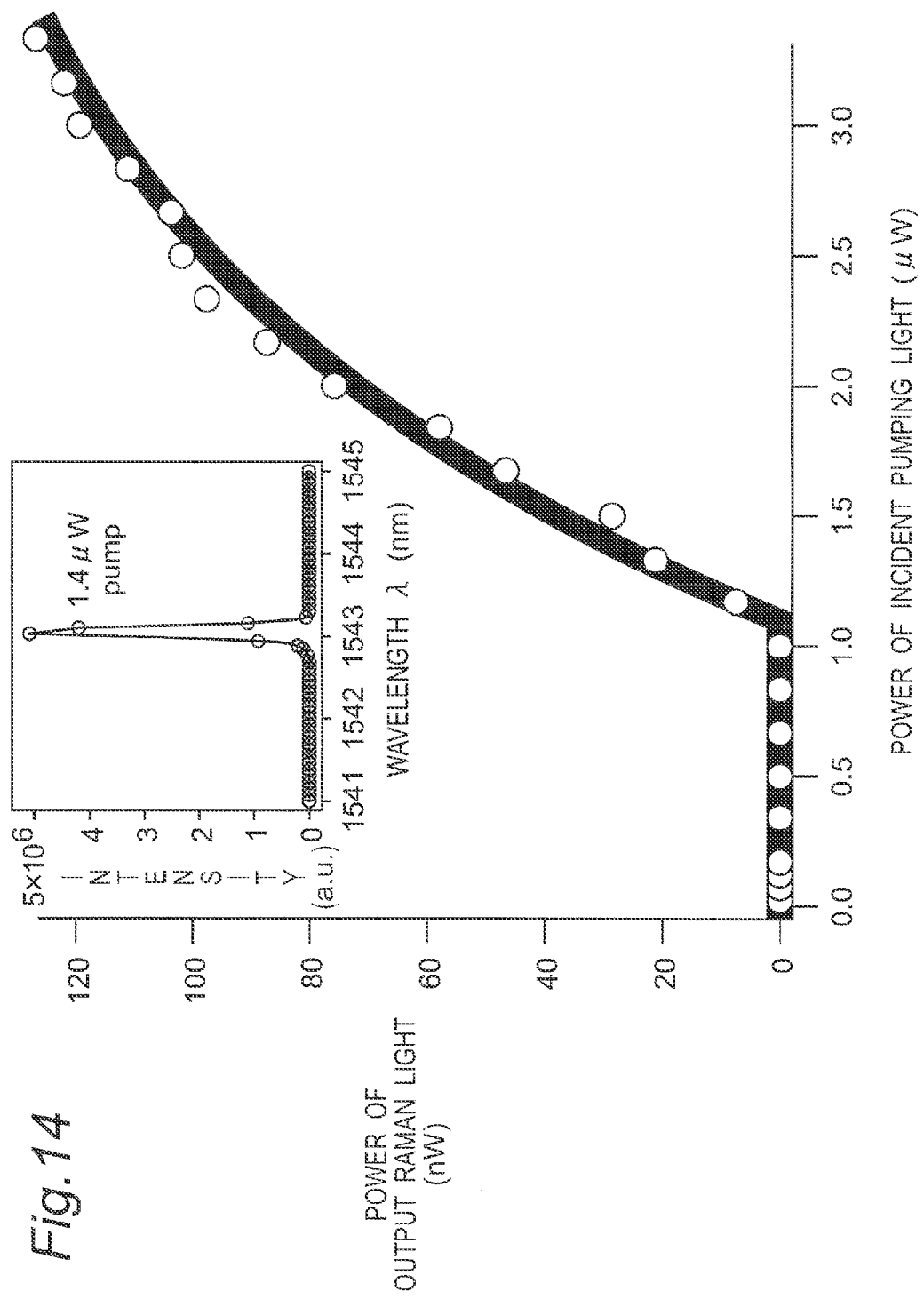
FIG. 14 is a chart of relationship between power of pumping light inputted into a Raman laser light source and power of stimulated Raman scattered light outputted from the Raman laser light source.

The inventors have succeeded in continuous oscillation of stimulated Raman scattered light with the configuration shown in FIG. 1. FIG. 14 is a graph showing the relation between power (horizontal axis) of pumping light (pump light) that is inputted into the optical resonator 100 from the LD 10, and power of stimulated Raman scattered light (hereinafter referred to as "Raman laser light") that is outputted from the optical resonator 100. It is to be noted that the pumping light used at this time is laser light (cw) having a spectral peak at a wavelength of 1425 nm.

As apparent from FIG. 14, the power of the Raman laser light (wavelength: 1540 nm) abruptly increases as the power of the pumping light inputted into the optical resonator 100 exceeds about 1 µW. That is, in the configuration shown in FIG. 1, continuous oscillation of Raman laser light is realized with an extremely low threshold of about 1 µW.

Although the threshold (about 1 µW in FIG. 14) for pumping light required for realizing continuous oscillation varies depending on magnitudes of Q values of the pumping light and the Raman scattered light in the optical resonator 100, when the Q value of the pumping light (first excitation waveguide mode) is about 0.1 million (or larger) and the Q value of the Raman scattered light (ground waveguide mode) is about 1 million (or larger), the threshold for the continuous oscillation of Raman laser light in the optical resonator 100 is about 1 µW in terms of the power of the pumping light.

As thus described, in the optical resonator 100, laser oscillation of the stimulated Raman scattered light occurs when the power of the inputted pumping light (cw, central wavelength: 1425 nm) exceeds about 1 µW. Then, Raman laser light having a central wavelength of 1540 nm is outputted from the optical resonator 100. As thus described, laser oscillation can be realized with an extremely low threshold of 1 µW in the optical resonator 100. This is extremely advantageous to a selection of a pumping light source, since the extremely low threshold provides degrees of freedom higher than hitherto in the selection of a pumping light source if a Raman laser light source is configured with the optical resonator 100 as a resonator.

For example, although a light-emitting diode (LED) has a broad spectral property as compared with a laser light source, such an LED can even be used as a pump light source (pumping light source) in the Raman laser light source in which the optical resonator 100 works as a resonator. In this case, the Raman laser light source can be realized with an LED as a pumping light source and the optical resonator 100. Just like the example described above, in the case where the Q value of the pumping light (first excitation waveguide mode) is about 0.1 million (or larger) and the Q value of the Raman scattered light (ground waveguide mode) is about 1 million (or larger) in the optical resonator 100, laser oscillation occurs due to the stimulated Raman scattered light in the optical resonator 100 and the Raman laser light is outputted when the power of light in a range of a line width of plus/minus about 5 pm (1424.995 nm-1425.005 nm) centered at the wavelength (1425 nm) included in the pumping light, which has a relatively broad band and is inputted into the optical resonator from the LED, exceeds 1 µW.

In short, the optical resonator 100 can be used as a resonator of a Raman laser light source. In this case, the pumping light source may only be a light source that inputs light having a wavelength corresponding to the pumping mode (first excitation waveguide mode) of the optical resonator 100 as the pumping light into the optical resonator 100. At the same time, since the optical resonator 100 has an extremely low threshold for laser oscillation of about 1 µW, a light-emitting diode (LED) can, for example, be used as the pumping light source as well as a laser light source, and the pumping light source is not limited thereto.

Further, the Raman laser light source may be provided with the optical resonator 200 (FIG. 12) in place of the optical resonator 100. At this time, the pumping light source of the Raman laser light source may be integrally configured on the same substrate as the photonic crystal where the optical resonator 200 is formed. This integrally configured pumping light source may be a light-emitting diode as well as the foregoing laser diode (LD) 110 or a compound semiconductor laser. The light-emitting diode may be a silicon LED, a compound semiconductor LED, or the like. As thus described, the Raman laser light source having the optical resonator 200 is the current injection-type silicon Raman laser light source provided with the pumping light source on the same substrate as the photonic crystal.

INDUSTRIAL APPLICABILITY

The Raman scattered light enhancement device and the method for fabricating the Raman scattered light enhancement device according to the present invention use a photonic crystal on a semiconductor substrate, in which holes are formed. For this, minimization, electric power saving, and continuous oscillation are made possible. In addition, easy fabrication and cost reduction may also be possible. Accordingly, this device is preferably applicable as a high-performance LSI not only to IT devices in electrical and electronics fields but also to a variety of fields of technology.

REFERENCE SIGN LIST

10: laser diode
11: lens fiber
12: light inputting device
13: input waveguide
14: micro-resonator
15: output waveguide
20: two-dimensional photonic crystal
20a: hole
30: light outputting device
31: lens fiber
100: optical resonator

The invention claimed is:

1. A Raman scattered light enhancement device comprising:
a waveguide provided in a photonic crystal made of a semiconductor substrate in which holes are formed, the waveguide having resonant modes with respect to incident light at a plurality of frequencies;
wherein:
a difference in frequency between one resonant mode and another resonant mode is set equal to a Raman shift frequency of the semiconductor substrate; and
a waveguide forming direction with respect to a crystal plane orientation of the semiconductor substrate is further set so as to maximize a Raman transition probability for the two resonant modes with the difference in frequency being equal to the Raman shift frequency, the Raman transition probability being represented by electromagnetic field distribution of the two resonant modes and a Raman tensor of the semiconductor substrate.

2. The Raman scattered light enhancement device according to claim 1, wherein the two resonant modes are a ground waveguide mode and a first excitation waveguide mode.

3. The Raman scattered light enhancement device according to claim 2, wherein:
the semiconductor substrate is silicon; and
the waveguide forming direction with respect to the crystal plane orientation of the semiconductor substrate is a direction of crystal orientation [100], or a plane orientation equivalent thereto, of the silicon.

4. The Raman scattered light enhancement device according to claim 1, wherein:
the waveguide is made up of a linear defect formed in the photonic crystal;
the waveguide is provided with an optical resonator having a pair of light reflecting interfaces; and
structure of the photonic crystal around the light reflecting interfaces is altered so that a light propagation wavelength band is shifted along the waveguide.

5. The Raman scattered light enhancement device according to claim 2, wherein:
the waveguide is made up of a linear defect formed in the photonic crystal;
the waveguide is provided with an optical resonator having a pair of light reflecting interfaces;
structure of the photonic crystal around the light reflecting interfaces is altered so that a light propagation wavelength band is shifted along the waveguide; and
the pair of light reflecting interfaces reflect both light of the ground waveguide mode and light of the first excitation waveguide mode.

6. A Raman laser light source comprising:
the Raman scattered light enhancement device according to claim 5; and
a pumping light source which outputs the light of the first excitation waveguide mode; wherein
the light of the first excitation waveguide mode outputted by the pumping light source is inputted into the optical resonator of the Raman scattered light enhancement device.

7. The Raman laser light source according to claim 6, wherein the pumping light source is a laser light source.

8. The Raman laser light source according to claim 6, wherein the pumping light source is a light-emitting diode.

9. The Raman laser light source according to claim 7, wherein the pumping light source is formed on the semiconductor substrate where the photonic crystal is formed.

10. A method for manufacturing a Raman scattered light enhancement device, the Raman scattered light enhancement device including a waveguide provided in a photonic crystal made of a semiconductor substrate in which holes are formed, the waveguide having resonant modes with respect to incident light at a plurality of frequencies, the method comprising:
setting a size and arrangement of the holes of the photonic crystal so as to equalize a difference in frequency between one resonant mode and another resonant mode to a Raman shift frequency of the semiconductor substrate; and
further setting a waveguide forming direction on a crystal plane orientation of the semiconductor substrate so as to maximize a Raman transition probability for the two resonant modes with the difference in frequency being equal to the Raman shift frequency, the Raman transition probability being represented by electromagnetic field distribution of the two resonant modes and a Raman tensor of the semiconductor substrate.

11. The Raman laser light source according to claim 8, wherein the pumping light source is formed on the semiconductor substrate where the photonic crystal is formed.

12. The Raman scattered light enhancement device according to claim 1, wherein the electromagnetic field distribution of the two modes has the same spatial symmetry in different electric field components from each other.

* * * * *